US009447769B1

(12) United States Patent
Hegedus

(10) Patent No.: US 9,447,769 B1
(45) Date of Patent: Sep. 20, 2016

(54) MOTION DEVICE SYSTEM

(71) Applicant: Stephen Hegedus, New Brunswick, NJ (US)

(72) Inventor: Stephen Hegedus, New Brunswick, NJ (US)

( * ) Notice: Subject to any disclaimer, the term of this patent is extended or adjusted under 35 U.S.C. 154(b) by 0 days.

(21) Appl. No.: 14/818,231

(22) Filed: Aug. 4, 2015

(51) Int. Cl.
| | |
|---|---|
| F03B 13/00 | (2006.01) |
| H02P 9/04 | (2006.01) |
| F03B 13/10 | (2006.01) |
| H02K 7/18 | (2006.01) |
| H02K 7/116 | (2006.01) |
| F02B 63/04 | (2006.01) |
| H02K 7/10 | (2006.01) |

(52) U.S. Cl.
CPC ............... *F03B 13/10* (2013.01); *H02K 7/116* (2013.01); *H02K 7/1861* (2013.01)

(58) Field of Classification Search
USPC ................... 290/1 C, 1 R, 54; 318/141, 142; 362/192; 310/75
See application file for complete search history.

(56) References Cited

U.S. PATENT DOCUMENTS

| | | | | |
|---|---|---|---|---|
| 1,412,972 A * | 4/1922 | Schwarzmann | ........ | F02P 1/005 310/75 B |
| 2,390,877 A * | 12/1945 | Fisher | ..................... | F21L 13/08 310/156.08 |
| 4,105,314 A | 8/1978 | Hughes, Jr. | | |
| 4,360,860 A * | 11/1982 | Johnson | ................... | F21L 13/06 320/123 |
| 4,701,835 A * | 10/1987 | Campagnuolo | ......... | F21L 13/06 320/162 |
| 4,703,188 A * | 10/1987 | Gottfried | ................ | F02N 11/04 123/179.22 |
| 4,746,806 A * | 5/1988 | Campagnuolo | ........... | F03G 5/06 290/1 E |
| 5,998,975 A * | 12/1999 | Tada | ..................... | H02K 7/1861 322/25 |
| D420,975 S * | 2/2000 | Honda | ........................ | D13/115 |
| 6,034,492 A * | 3/2000 | Saito | ..................... | H02J 7/1415 290/1 C |
| 6,690,141 B1 * | 2/2004 | Yu | ......................... | H01M 10/46 320/107 |
| 6,914,340 B2 * | 7/2005 | Becker | ..................... | F21L 13/06 290/1 C |
| 6,959,999 B2 * | 11/2005 | Lee | ......................... | F21L 13/06 362/183 |
| 7,009,350 B1 * | 3/2006 | Gold | ........................ | H02P 9/48 290/1 A |
| 7,077,540 B2 * | 7/2006 | Yen | ......................... | F21L 13/06 362/119 |
| 7,205,732 B1 * | 4/2007 | Gold | ........................ | H02P 9/48 290/1 A |
| 7,222,984 B2 * | 5/2007 | Lee | ......................... | F21L 13/06 320/123 |
| 7,482,718 B2 | 1/2009 | Terzian et al. | | |
| 7,608,933 B2 * | 10/2009 | Yang | ..................... | H02K 7/1853 290/1 A |
| RE41,060 E * | 12/2009 | Yu | ......................... | H02K 7/1861 320/107 |
| 7,723,880 B2 | 5/2010 | Dai | | |
| 8,525,357 B2 * | 9/2013 | Li | ............................. | F03G 5/06 290/1 A |

* cited by examiner

*Primary Examiner* — Pedro J Cuevas
(74) *Attorney, Agent, or Firm* — RG Patent Consulting, LLC; Rachel Gilboy

(57) ABSTRACT

A motion device power generating system; a specially designed alternative energy source that, via a manually operated generator system, seeks to provide power free of fossil fuels and strain on the power grid.

20 Claims, 5 Drawing Sheets

MOTION DEVICE SYSTEM

CROSS-REFERENCE TO RELATED APPLICATION

The present application is related to and claims priority from prior provisional application Ser. No. 62/033,592, filed Aug. 5, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of generator devices and more specifically relates to a manually operated generator system.

2. Description of the Related Art

In a simple generator, a coil of conducting wire is placed between two magnets and spun, inducing an electric current. The generator's Alternating Current, in which electrons move back and forth, differs from a battery's Direct Current, in which electrons always flow in one direction, from negative to positive. In the contemporary world, generators range from the huge hydroelectric turbines that power cities to the gas-powered emergency generators that consumers use during power outages, to the generators which help to maintain the charge in our car batteries.

All generators, however, depend on a motive force to spin their coils. The force of flowing water rotates the fins in a hydroelectric turbine, and the fins in turn rotate a revolving shaft that rotates the coils; gas-powered generators use an internal combustion engine and a driveshaft to rotate the coils; and the coils in a car's generator are spun by a driveshaft connected to a belt driven by the engine. Thus, to generate electricity, a generator requires an input of kinetic, or mechanical, energy. The invention discussed in this report would provide this input via a mechanical system derived from a combination of metal, water, and motion that generates the electrical current needed Various attempts have been made to solve the above-mentioned problems such as those found in U.S. Pat. No. 7,723,880 to Jen Hao Dai; U.S. Pat. No. 4,105,314 to Jr. Alexander W. Hughes; and U.S. Pat. No. 7,482,718 to Jack A. Ekchian. This art is representative of generators. None of the above inventions and patents, taken either singly or in combination, is seen to describe the invention as claimed.

Ideally, a motion device generating system should provide efficient power-providing means and, yet would operate reliably and be manufactured at a modest expense. Thus, a need exists for a reliable motion device generating system to avoid the above-mentioned problems.

BRIEF SUMMARY OF THE INVENTION

In view of the foregoing disadvantages inherent in the known generator art, the present invention provides a novel motion device generating system. The general purpose of the present invention, which will be described subsequently in greater detail is to provide a portable means for providing power generation.

A motion device power generating system is disclosed herein, in a preferred embodiment, comprising: a power generating assembly including a housing (having an inlet, and an outlet), a rotor assembly, a vertical columnar member, a drivegear assembly, a crank (the crank may be removable), a crank mount, and a support stand; as such the motion device power generating system comprises the power generating assembly.

The power generating assembly comprises in functional combination the housing, the rotor assembly, the vertical columnar member, the drivegear assembly, the crank, the crank mount, and the support stand. The housing houses the rotor assembly and fluid, the housing supported positionally via the vertical columnar member, and the support stand. The crank mount is fixedly connected to the vertical columnar member and the support stand. The crank is supported on the crank mount such that the drivegear assembly is suitably positioned adjacent and beneath the housing such that movement of the rotor assembly is able to be provided when the crank is turned. Since the drivegear is located on the bottom it lowers the center of gravity such that the device is more stable during use. The drivegear assembly is equipped on the vertical columnar member and the crank; wherein the drivegear assembly comprises a gear and a sprocket; the gear being located about a periphery of the vertical columnar member. The sprocket is located about an outer diameter near a terminal end of the crank; wherein the crank is manually operated in preferred embodiments.

The housing is mounted horizontal to and perpendicular to the vertical columnar member; wherein the vertical columnar member comprises a cylindrical shaft. The crank mount comprises a c-shape suitable that the housing is accommodated horizontally and is stable on the support stand of the power generating assembly. The power generating assembly further comprises at least one bearing located between the housing and the cylindrical shaft. The rotor assembly comprises a plurality of turbines mounted within confines of the housing; the turbines rotated as the crank is turned such that the fluid is displaced causing fluid flow; the fluid able to ingress through the inlet and able to egress out of outlet; the fluid exiting the outlet having kinetic energy able to be harvested. The turbines mounted within the confines of the housing are centrifically-mounted. The motion device power generating system extracts (makes available the extraction/use) the kinetic energy from the fluid flow created by the rotor assembly and provides a portable means to produce electrical energy converted from the kinetic energy available from the fluid flow.

A method of using a motion device power generating system comprising the steps of: connecting a power generating assembly to an external kinetic energy harvester, and manually rotating a crank to operate a rotor assembly to produce a fluid flow to generate electrical energy converted from kinetic energy provided. The method may further comprise the step of moving the power generating assembly by hand to another location as needed.

The present invention holds significant improvements and serves as a motion device generating system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, motion device generating system, constructed and operative according to the teachings of the present invention.

The various embodiments of the present invention will hereinafter be described in conjunction with the appended drawings, wherein like designations denote like elements.

DETAILED DESCRIPTION

Figure 1:
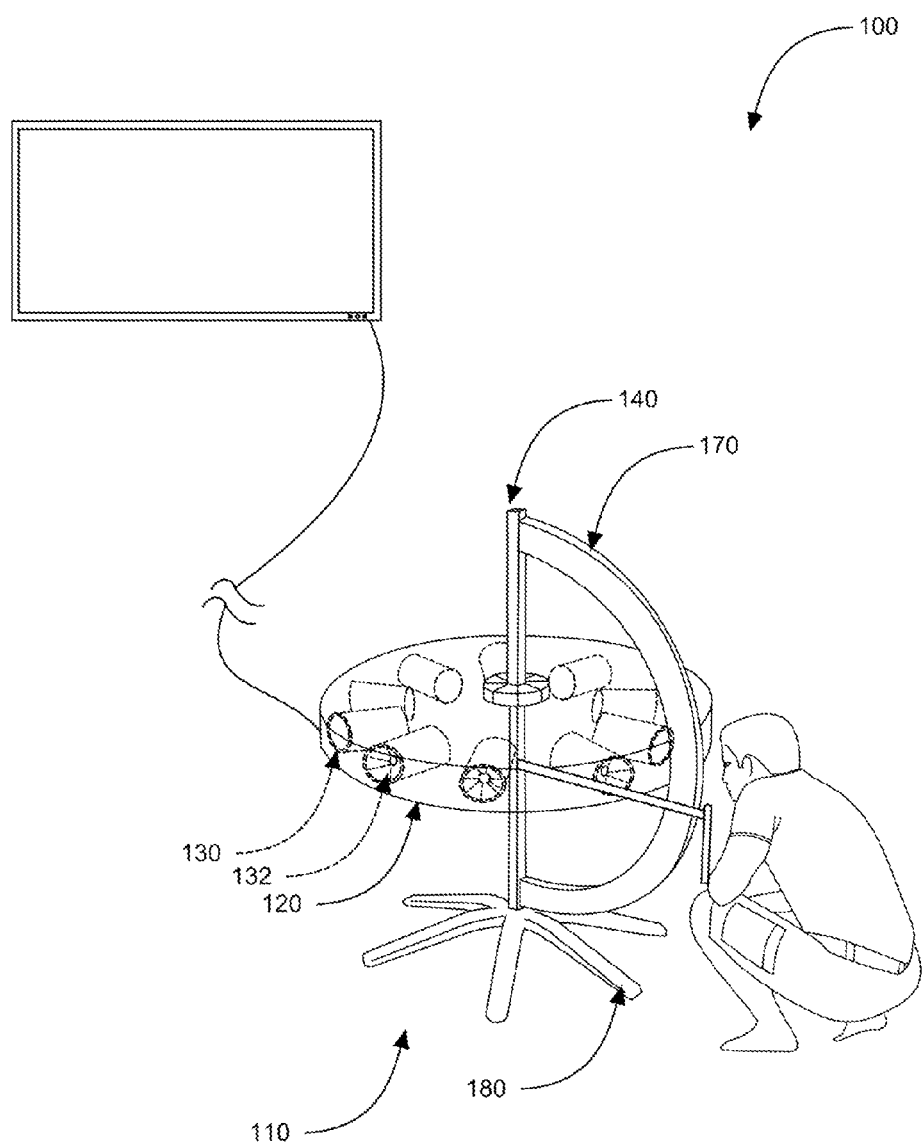
FIG. 1 shows a perspective view illustrating a motion device generating system in an in-use condition according to an embodiment of the present invention.
Figure 2:
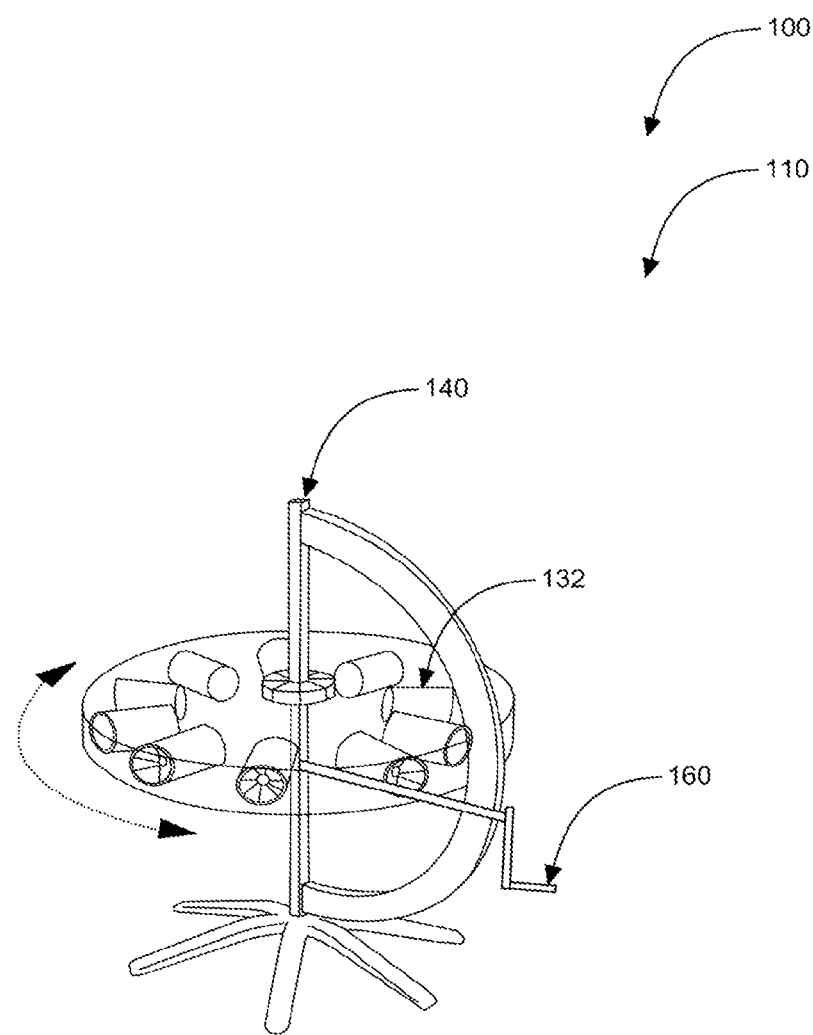
FIG. 2 is a perspective view illustrating a power generating assembly according to an embodiment of the present invention of FIG. 1.
Figure 3:
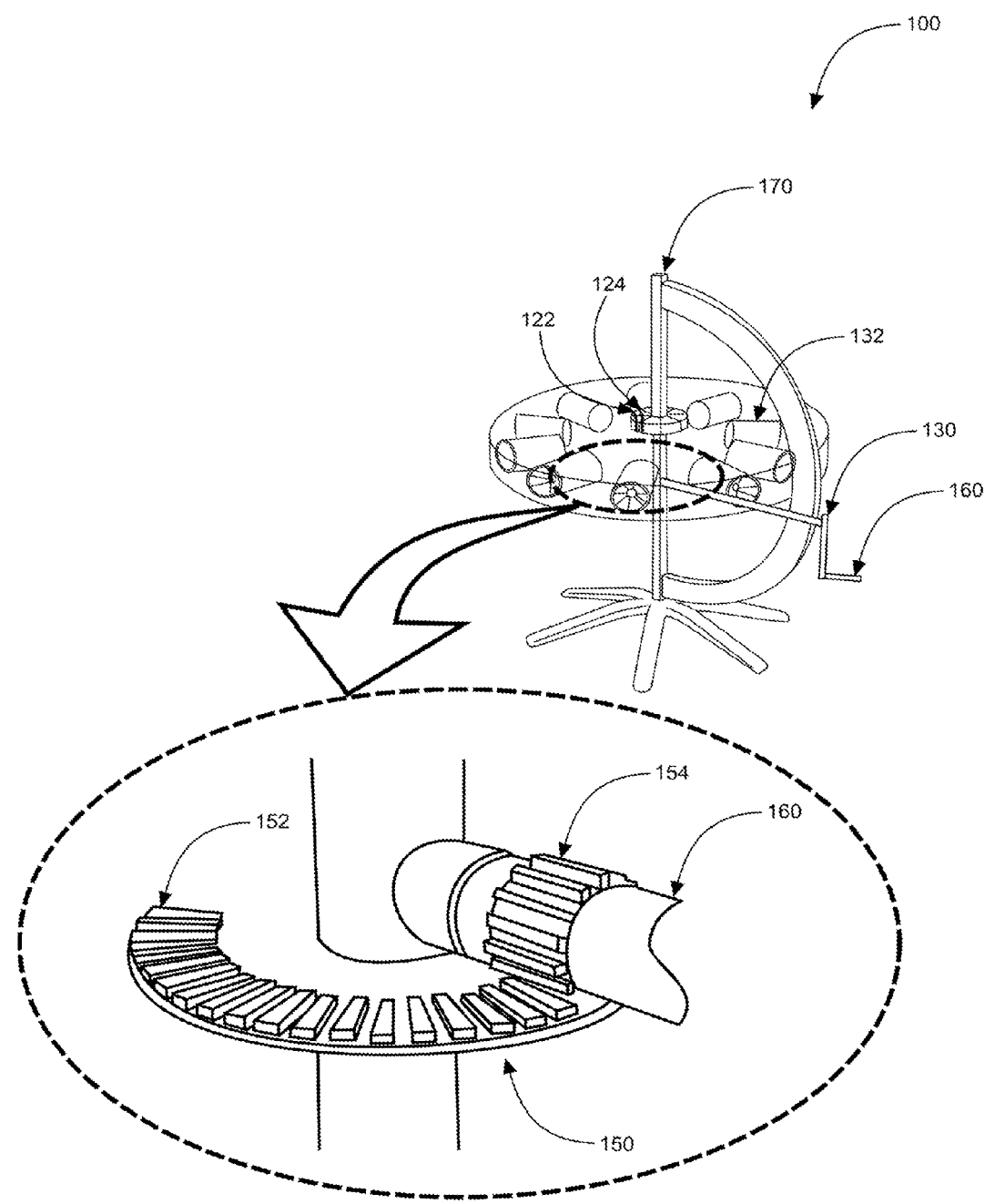
FIG. 3 is a perspective view illustrating the power generating assembly according to an embodiment of the present invention of FIG. 1.
Figure 4:
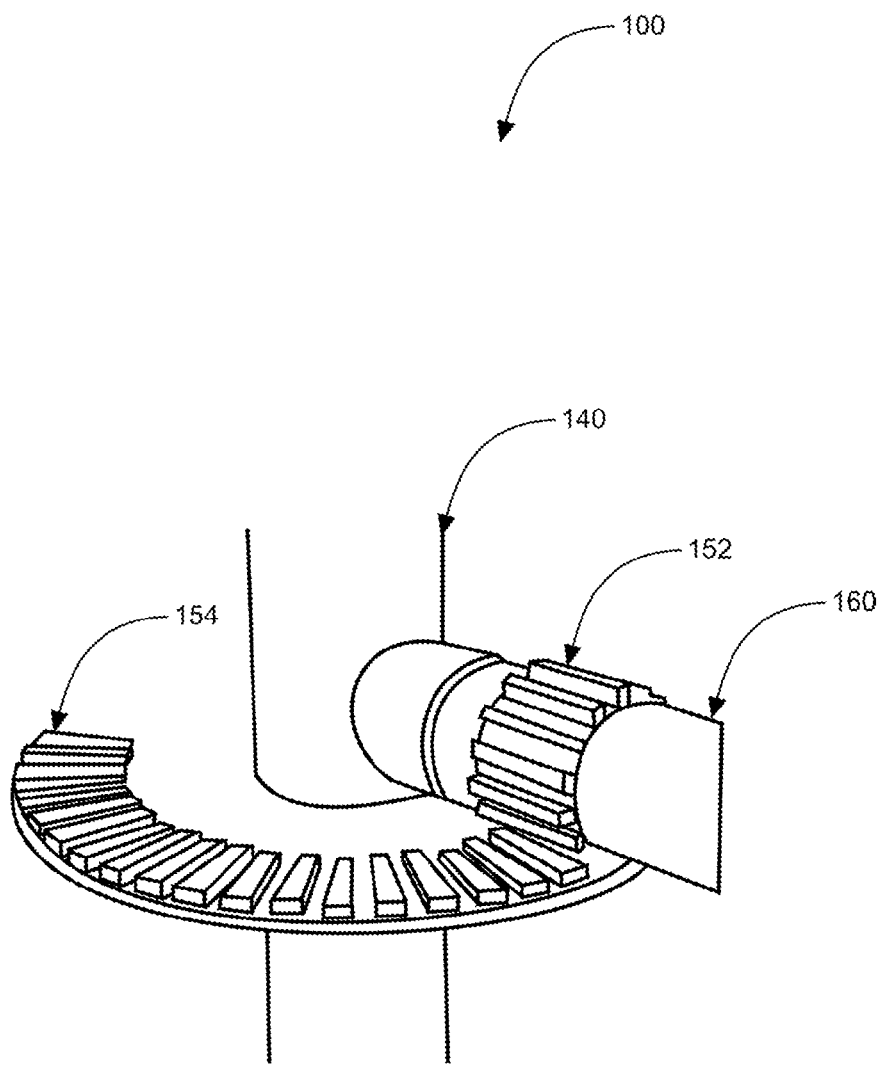
FIG. 4 is a perspective view illustrating a drive gear as used with the motion device generating system according to an embodiment of the present invention of FIG. 1.

As discussed above, embodiments of the present invention relate to a generator and more particularly to a motion device generating system as used to improve the generation of power.

Generally speaking, the Motion Device (motion device power generating system) comprises a specially designed alternative energy source that, via a manually operated generator system, seeks to provide power free of fossil fuels and strain on the power grid. The Motion Device may be fabricated of an aluminum material consisting of a series of welded pieces, forming a turbine-like unit atop a sturdy stand. A wheel (housing) is placed onto a liquid filled surface. A hand-operated crank is attached to the wheel, and the interior of the wheel comprises s a rotary mechanism, or the turbine, that is able to extract energy from the fluid.

The Motion Device may have at least one (1) moving part, referred to as the rotor assembly, which is a shaft or drum with blades attached. With the structure put into motion by the crank, the turbine moves the liquid horizontally, creating centrifugal force via the perpendicular motion of the wheel. As a result, the operational aspects of the Motion Device are able to power small appliances and devices, proving extremely handy in emergency situations or when one is away from conventional power sources.

The Motion Device may require only a compact, manually operated assembly for the creation of renewable power, and no fossil fuels such as gasoline or oil. The Motion Device may therefore release no exhaust gases or particulate emissions into the atmosphere, and therefore produce no air pollution.

Further, because the Motion Device may not depend on additional electricity to work (other than manual), this system may not put a strain on the power grid, and may result in cost savings as well. Aside from the environmental benefits, this product may serve well in emergency situations, such as during loss of power due to a storm or other mishap.

Referring now to the drawings by numerals of reference there is shown in FIGS. 1-4, various views of motion device power generating system 100 comprising: power generating assembly 110 including housing 120 having inlet 122, and outlet 124, rotor assembly 130, vertical columnar member 140, drivegear assembly 150, crank 160, crank mount 170, and support stand 180; wherein motion device power generating system 100 comprises power generating assembly 110.

Power generating assembly 110 comprises in functional combination housing 120, rotor assembly 130, vertical columnar member 140, drivegear assembly 150, crank 160, crank mount 170, and support stand 180. Housing 120 houses rotor assembly 130 and fluid; housing 120 supported positionally via vertical columnar member 140, and support stand 180. Crank mount 170 is fixedly connected to vertical columnar member 140 and support stand 180, as shown. Crank 160 is supported on crank mount 170 such that drivegear assembly 150 is suitably positioned adjacent and beneath housing 120 such that movement of rotor assembly 130 is able to be provided when crank 160 is turned. Other 'drive means' may be used.

Drivegear assembly 150 is equipped on vertical columnar member 140 and crank 160, respectively. Housing 120 is preferably mounted horizontal to and perpendicular to vertical columnar member 140. Rotor assembly 130 comprises a plurality of turbines 132 mounted within confines of housing 120; turbines 132 rotated as crank 160 is turned such that the fluid is displaced causing fluid flow; the fluid able to ingress through inlet 122 and able to egress out of outlet 124; the fluid exiting outlet 124 having kinetic energy able to be harvested. In this way motion device power generating system 100 extracts the kinetic energy from the fluid flow created by rotor assembly 130 and provides a portable means to produce electrical energy converted from the kinetic energy available from the fluid flow. Those with ordinary skill in the art will now appreciate that upon reading this specification and by their understanding the art of use of turbines in relation to flow and harvesting and communicating the harvested electrical energy in kinetic form as described herein, methods of use and enablement will be understood by those knowledgeable in such art. Piping and connections for use of fluid may be used.

Turbines 132 mounted within the confines of housing 120 are centrifically-mounted; wherein the turbines 132 are preferably shaft-mounted within the confines of housing 120. Those with ordinary skill in the art will now appreciate that upon reading this specification and by their understanding the art of mounting and use of turbines as described herein, methods of use and enablement will be understood by those knowledgeable in such art.

Housing 120, when rotated (some versions may be static), creates centrifugal force. In some embodiments housing 120 may be fixed. Turbines 132 are used to push the fluid; fluid may comprise water; or non-water liquid. The fluid (when water) comprises a density of 999.8395 kg/m3 at zero degrees Celcius. The fluid (alternate fluid or water with additive) may comprise a density of greater than 999.8395 kg/m3 at zero degrees Celcius, or a density of less than 999.8395 kg/m3 at zero degrees Celcius.

Drivegear assembly 150 comprises gear 152 and sprocket 154 in preferred embodiments; wherein gear 152 is located about a periphery of vertical columnar member 140. Sprocket 154 is preferably located about an outer diameter near a terminal end of crank 160. Crank 160 is manually operated in preferred embodiments since it is efficient and readily portable. Crank mount 170 preferably comprises a c-shape suitable such that housing 120 is accommodated horizontally and is stable on support stand 180 of power generating assembly 110. Vertical columnar member 140 comprises a cylindrical shaft in preferred embodiments so as to mount at least one bearing thereon located between housing 120 and the cylindrical shaft.

Motion device power generating system 100 may be sold as a kit comprising the following parts: at least one power generating assembly 110; and at least one set of user instructions. The kit has instructions such that functional relationships are detailed in relation to the structure of the invention (such that the invention can be used, maintained, or the like in a preferred manner). Motion device power generating system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
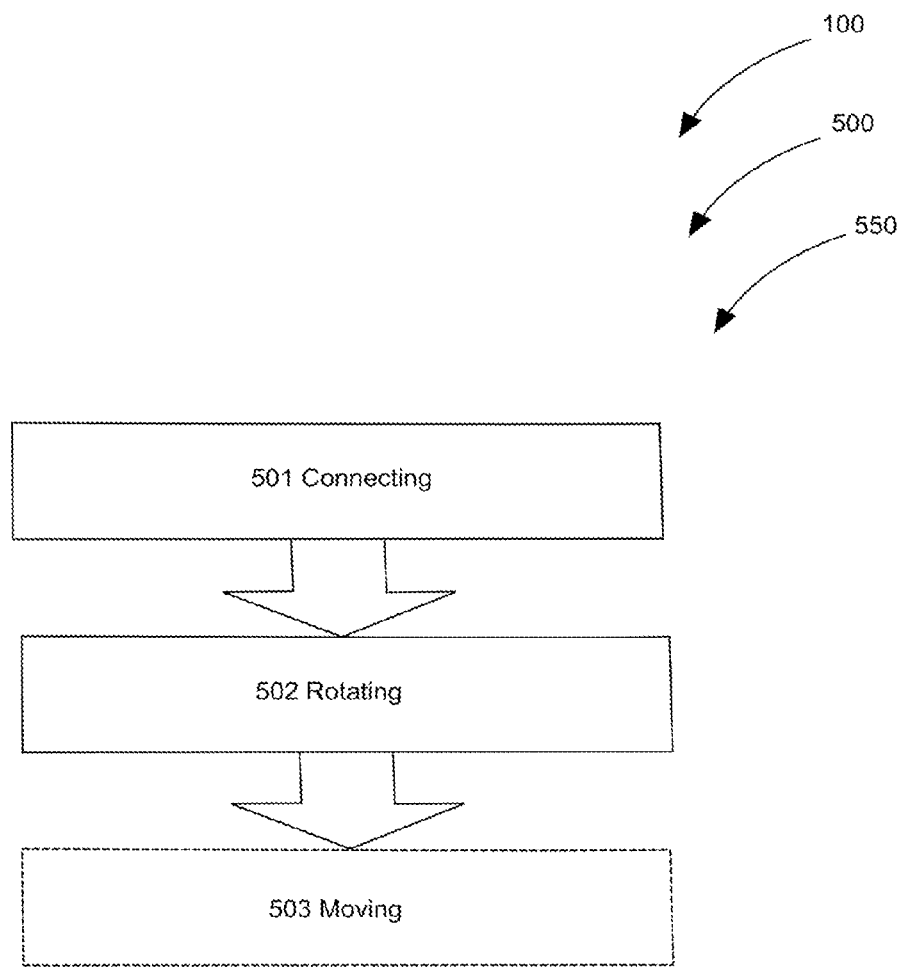
FIG. 5 is a flowchart illustrating a method of use for the motion device generating system according to an embodiment of the present invention of FIGS. 1-4.

Referring now to FIG. 5, showing flowchart 550 illustrating a method of use 500 for motion device generating system 100 according to an embodiment of the present invention of FIGS. 1-4.

A method of using (method of use 500) motion device power generating system 100 comprises the steps of: step one 501 connecting power generating assembly 110 to an external kinetic energy harvester, and step two 502 manually rotating crank 160 to operate rotor assembly 130 to produce a fluid flow to generate electrical energy converted from the kinetic energy provided. The method 500 may further comprise the step three 503 of moving power generating assembly 110 by hand to another location as needed to provide remote or direct generating means as needed.

It should be noted that step 503 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A motion device power generating system comprising a power generating assembly including:
    a housing having an inlet, an outlet, and a crank mount;
    a rotor assembly located within said housing;
    a fluid filling said housing;
    a drive gear assembly located within said housing;
    a crank being supported by said crank mount, wherein said drive gear assembly is suitably positioned adjacent and beneath said housing;
    a vertical columnar member supporting said housing; and
    a support stand supporting said vertical columnar member;
    wherein said drive gear assembly is mechanically connected between said vertical columnar member and said crank;
    wherein said rotor assembly further comprises a plurality of turbines mounted within confines of said housing; and
    wherein said turbines rotated as said crank is turned such that said fluid is displaced causing fluid flow, said fluid able to ingress through said inlet and able to egress out of said outlet, said fluid exiting said outlet having kinetic energy.

2. The motion device power generating system of claim 1 wherein said turbines mounted within said confines of said housing are centrifically-mounted.

3. The motion device power generating system of claim 2 wherein said turbines are shaft-mounted within said confines of said housing.

4. The motion device power generating system of claim 1 wherein said fluid comprises water.

5. The motion device power generating system of claim 1 wherein said fluid comprises a non-water liquid.

6. The motion device power generating system of claim 4 wherein said fluid comprises a density of 999.8395 kg/m$^3$ at zero degrees celcius.

7. The motion device power generating system of claim 5 wherein said fluid comprises a density of greater than 999.8395 kg/m$^3$ at zero degrees celcius.

8. The motion device power generating system of claim 5 wherein said fluid comprises a density of less than 999.8395 kg/m$^3$ at zero degrees celcius.

9. The motion device power generating system of claim 1 wherein said drivegear assembly comprises a gear and a sprocket.

10. The motion device power generating system of claim 9 wherein said gear is located about a periphery of said vertical columnar member.

11. The motion device power generating system of claim 10 wherein said sprocket is located about an outer diameter near a terminal end of said crank.

12. The motion device power generating system of claim 11 wherein said crank is manually operated.

13. The motion device power generating system of claim 1 wherein said crank mount comprises a c-shape suitable that said housing is accommodated horizontally and is stable on said support stand of said power generating assembly.

14. The motion device power generating system of claim 1 wherein said vertical columnar member comprises a cylindrical shaft.

15. The motion device power generating system of claim 14 wherein said power generating assembly further comprises at least one bearing located between said housing and said cylindrical shaft.

16. The motion device power generating system of claim 1 wherein said housing, when rotated, creates centrifugal force.

17. A motion device power generating system comprising a power generating assembly including:
   a housing having an inlet, an outlet, and a crank mount;
   a rotor assembly located within said housing;
   a fluid filling said housing;
   a drive gear assembly having a gear and a sprocket and located within said housing, said gear being located about a periphery of said vertical columnar member and said sprocket being located about an outer diameter near a terminal end of said crank;
   a manually operated crank being supported by said crank mount, wherein said drive gear assembly is suitably positioned adjacent and beneath said housing;
   a vertical columnar member supporting said housing and comprising a cylindrical shaft; and
   a support stand supporting said vertical columnar member;
   wherein said drive gear assembly is mechanically connected between said vertical columnar member and said crank;
   wherein said crank mount comprises a c-shape, said housing being accommodated horizontally;
   wherein said power generating assembly further comprises at least one bearing located between said housing and said cylindrical shaft;
   wherein said rotor assembly further comprises a plurality of turbines mounted within confines of said housing; and
   wherein said turbines rotated as said crank is turned such that said fluid is displaced causing fluid flow, said fluid able to ingress through said inlet and able to egress out of said outlet, said fluid exiting said outlet having kinetic energy.

18. The motion device power generating system of claim 17 wherein said crank is removable.

19. A method of using a motion device power generating system of claim 1 or claim 17, comprising the steps of:
   connecting a power generating assembly to an external kinetic energy harvester; and
   manually rotating a crank to operate a rotor assembly to produce a fluid flow to generate electrical energy converted from kinetic energy provided.

20. The method of claim 19 further comprising the step of moving said power generating assembly by hand to another location as needed.

\* \* \* \* \*